US009642092B2

(12) United States Patent
Yokoyama

(10) Patent No.: US 9,642,092 B2
(45) Date of Patent: May 2, 2017

(54) APPARATUS FOR CONTROLLING MODULATION AND CODING SCHEME DEPENDING ON COMMUNICATION SPEED

(71) Applicant: FUJITSU LIMITED, Kawasaki-shi, Kanagawa (JP)

(72) Inventor: Hitoshi Yokoyama, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/223,563

(22) Filed: Mar. 24, 2014

(65) Prior Publication Data

US 2014/0321292 A1 Oct. 30, 2014

(30) Foreign Application Priority Data

Apr. 24, 2013 (JP) ................. 2013-091072

(51) Int. Cl.
| | |
|---|---|
| *H04W 72/08* | (2009.01) |
| *H04W 52/24* | (2009.01) |
| *H04W 52/26* | (2009.01) |
| *H04L 1/00* | (2006.01) |
| *H04W 24/08* | (2009.01) |
| *H04W 52/20* | (2009.01) |
| *H04W 52/36* | (2009.01) |
| *H04W 28/06* | (2009.01) |
| *H04W 28/22* | (2009.01) |
| *H04W 84/04* | (2009.01) |

(52) U.S. Cl.
CPC ......... *H04W 52/241* (2013.01); *H04L 1/0003* (2013.01); *H04L 1/0009* (2013.01); *H04L 1/0015* (2013.01); *H04W 52/20* (2013.01); *H04W 52/262* (2013.01); *H04W 28/06* (2013.01); *H04W 28/22* (2013.01); *H04W 52/362* (2013.01); *H04W 84/045* (2013.01)

(58) Field of Classification Search
None
See application file for complete search history.

(56) References Cited

U.S. PATENT DOCUMENTS

| 5,386,589 A | 1/1995 | Kanai |
| 6,035,210 A * | 3/2000 | Endo et al. .................. 455/522 |
| 6,240,124 B1 * | 5/2001 | Wiedeman et al. ......... 375/130 |

(Continued)

FOREIGN PATENT DOCUMENTS

| JP | H05-244056 A | 9/1993 |
| JP | 2002-354545 A | 12/2002 |

(Continued)

OTHER PUBLICATIONS

Japanese Office Action of related Japanese patent application No. 2013-091072 dated Aug. 30, 2016.

*Primary Examiner* — Jeffrey M Rutkowski
*Assistant Examiner* — Jonathan B Wood
(74) *Attorney, Agent, or Firm* — Arent Fox LLP

(57) ABSTRACT

A base station performs wireless communication with a first apparatus, and performs wired communication with a second apparatus. When a first communication speed corresponding to a wireless quality of the wireless communication is higher than a second communication speed of the wired communication, the base station changes a currently set modulation and coding scheme to a modulation and coding scheme corresponding to the second communication speed.

8 Claims, 15 Drawing Sheets

(56) References Cited

U.S. PATENT DOCUMENTS

| | | | |
|---|---|---|---|
| 6,580,531 B1* | 6/2003 | Swanson et al. | 398/5 |
| 7,821,929 B2* | 10/2010 | DelRegno | H04L 47/10 370/230 |
| 8,175,181 B1* | 5/2012 | Nabar et al. | 375/267 |
| 8,213,978 B1* | 7/2012 | Ho et al. | 455/522 |
| 8,300,716 B1* | 10/2012 | Lee et al. | 375/260 |
| 8,688,163 B2* | 4/2014 | Chen et al. | 455/522 |
| 8,923,136 B2* | 12/2014 | Simonsson et al. | 370/242 |
| 9,270,738 B2* | 2/2016 | Karaoguz | G06F 9/5055 |
| 2002/0091853 A1* | 7/2002 | Moore et al. | 709/236 |
| 2003/0142631 A1* | 7/2003 | Silvester | H04L 1/0001 370/252 |
| 2003/0156596 A1 | 8/2003 | Sumasu et al. | |
| 2006/0034220 A1* | 2/2006 | Shinshou | H04W 36/06 370/329 |
| 2006/0040696 A1 | 2/2006 | Lin | |
| 2007/0060062 A1* | 3/2007 | Wengerter et al. | 455/63.2 |
| 2007/0147289 A1* | 6/2007 | Nibe | 370/329 |
| 2007/0155338 A1* | 7/2007 | Hong | H04B 7/026 455/69 |
| 2007/0161399 A1* | 7/2007 | Hata | H04M 1/72519 455/550.1 |
| 2007/0223602 A1* | 9/2007 | Yu | H03M 13/11 375/260 |
| 2008/0123582 A1* | 5/2008 | Maekawa | 370/315 |
| 2008/0198785 A1* | 8/2008 | Huang et al. | 370/312 |
| 2008/0285512 A1* | 11/2008 | Pan et al. | 370/329 |
| 2009/0034599 A1* | 2/2009 | Jungerman | H04L 1/20 375/228 |
| 2009/0191831 A1* | 7/2009 | Sasaki et al. | 455/272 |
| 2009/0233598 A1* | 9/2009 | Fukuoka et al. | 455/434 |
| 2010/0054141 A1* | 3/2010 | Youn et al. | 370/252 |
| 2010/0080320 A1 | 4/2010 | Yano et al. | |
| 2010/0298000 A1* | 11/2010 | Li | H04W 48/08 455/440 |
| 2010/0325501 A1* | 12/2010 | Sakai | H04L 1/0045 714/746 |
| 2011/0030025 A1* | 2/2011 | Bertonis | H04N 21/43637 725/118 |
| 2011/0044186 A1* | 2/2011 | Jung | H04L 1/0026 370/252 |
| 2011/0059691 A1* | 3/2011 | Hegge | 455/11.1 |
| 2011/0067082 A1* | 3/2011 | Walker | H04H 60/05 725/114 |
| 2011/0113178 A1* | 5/2011 | Hosoi | G06F 13/4072 710/313 |
| 2011/0171914 A1* | 7/2011 | Kim et al. | 455/68 |
| 2011/0317543 A1* | 12/2011 | Medina | H04L 1/0009 370/216 |
| 2012/0021800 A1* | 1/2012 | Wilson et al. | 455/550.1 |
| 2012/0044828 A1* | 2/2012 | Seo | H04B 7/15521 370/252 |
| 2012/0076092 A1* | 3/2012 | Lu et al. | 370/329 |
| 2012/0157090 A1* | 6/2012 | Kim et al. | 455/424 |
| 2012/0263140 A1 | 10/2012 | Nishio et al. | |
| 2012/0327822 A1* | 12/2012 | Arakawa | H04W 28/048 370/280 |
| 2013/0107827 A1* | 5/2013 | Dinan | 370/329 |
| 2013/0114520 A1* | 5/2013 | Cheng | H04W 28/0205 370/329 |
| 2013/0114658 A1* | 5/2013 | Davydov et al. | 375/224 |
| 2014/0198784 A1* | 7/2014 | Nakajima | H04J 3/0641 370/350 |
| 2014/0269597 A1* | 9/2014 | Park et al. | 370/329 |
| 2014/0274100 A1* | 9/2014 | Galeev et al. | 455/452.2 |
| 2015/0063139 A1* | 3/2015 | Zhang et al. | 370/252 |
| 2015/0195074 A1* | 7/2015 | Eriksson | H04L 1/0022 370/252 |

FOREIGN PATENT DOCUMENTS

| | | |
|---|---|---|
| JP | 2006-510313 A | 3/2006 |
| JP | 2006-287895 A | 10/2006 |
| JP | 2009-267479 A | 11/2009 |
| JP | 2010-87730 A | 4/2010 |
| JP | 2010-273050 A | 12/2010 |
| JP | 2011-61464 A | 3/2011 |
| JP | 2012-222719 A | 11/2012 |

* cited by examiner

FIG. 10

| TBS INDEX | MODULATION SCHEME ID NUMBER | CODING RATE | MAXIMUM WIRELESS COMMUNICATION SPEED (Mbps) |
|---|---|---|---|
| 0 | 2 | 0.097 | 2.792 |
| 1 | 2 | 0.126 | 3.624 |
| 2 | 2 | 0.159 | 4.584 |
| 3 | 2 | 0.199 | 5.736 |
| 4 | 2 | 0.251 | 7.224 |
| 5 | 2 | 0.304 | 8.760 |
| 6 | 2 | 0.358 | 10.296 |
| 7 | 2 | 0.424 | 12.216 |
| 8 | 2 | 0.49 | 14.112 |
| 9 | 2 | 0.55 | 15.840 |
| 10 | 4 | 0.305 | 17.568 |
| 11 | 4 | 0.345 | 19.848 |
| 12 | 4 | 0.398 | 22.920 |
| 13 | 4 | 0.442 | 25.456 |
| 14 | 4 | 0.492 | 28.336 |
| 15 | 4 | 0.531 | 30.576 |
| 16 | 4 | 0.57 | 32.856 |
| 17 | 6 | 0.425 | 36.696 |
| 18 | 6 | 0.454 | 39.232 |
| 19 | 6 | 0.507 | 43.816 |

| TBS INDEX | MODULATION SCHEME ID NUMBER | CODING RATE | MAXIMUM WIRELESS COMMUNICATION SPEED (Mbps) |
|---|---|---|---|
| 20 | 6 | 0.543 | 46.888 |
| 21 | 6 | 0.591 | 51.024 |
| 22 | 6 | 0.637 | 55.056 |
| 23 | 6 | 0.664 | 57.336 |
| 24 | 6 | 0.714 | 61.664 |
| 25 | 6 | 0.738 | 63.776 |
| 26 | 6 | 0.872 | 75.376 |

FIG. 13

| TRANSMIT POWER (dBm) | WIRELESS ERROR RATE (%) |
|---|---|
| 10 | 0 |
| 9 | 0 |
| 8 | 0 |
| 7 | 0 |
| 6 | 0 |
| 5 | 0 |
| 4 | 4 |

| TRANSMIT POWER (dBm) | WIRELESS ERROR RATE (%) | WIRELESS-ERROR-RATE-CORRECTED MAXIMUM WIRELESS COMMUNICATION SPEED (Mbps) | WIRED COMMUNICATION SPEED (Mbps) |
|---|---|---|---|
| 10 | 0 | 63.776 | 61 |
| 9 | 0 | 63.776 | 61 |
| 8 | 0 | 63.776 | 61 |
| 7 | 0 | 63.776 | 61 |
| 6 | 0 | 63.776 | 61 |
| 5 | 0 | 63.776 | 61 |
| 4 | 4 | 61.224 | 61 |
| 3 | 15 | 54.209 | 56 |

P21 ↑ P22 ↑ P23 ↑

APPARATUS FOR CONTROLLING MODULATION AND CODING SCHEME DEPENDING ON COMMUNICATION SPEED

CROSS-REFERENCE TO RELATED APPLICATION

This application is based upon and claims the benefit of priority of the prior Japanese Patent Application No. 2013-091072, filed on Apr. 24, 2013, the entire contents of which are incorporated herein by reference.

FIELD

The embodiments discussed herein are related to an apparatus for controlling modulation and coding scheme depending on communication speed.

BACKGROUND

There is a base station that performs wireless communication with a first apparatus (for example, a portable terminal) and that performs wired communication with a second apparatus (for example, a server). The base station is connected to the server, for example, via a wired backhaul line. The terminal performs communication with the server via the base station.

Currently, the wireless communication speed has become high, and has reached 10 Mbps or higher, for example, 150 to 300 Mbps.

The related art is described, for example, in Japanese Laid-open Patent Publication Nos. 2011-061464, 2010-273050, 2009-267479, and 2010-87730.

SUMMARY

According to an aspect of the invention, a base station performs wireless communication with a first apparatus, and performs wired communication with a second apparatus. When a first communication speed corresponding to a wireless quality of the wireless communication is higher than a second communication speed of the wired communication, the base station changes, a currently set modulation and coding scheme to a modulation and coding scheme corresponding to the second communication speed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is an example of a first table referred to when the scheduler determines the maximum wireless communication speed and selects the MCS, according to an embodiment;

FIG. 13 is an example of a diagram illustrating a relationship between transmit power control and the wireless error rate;

FIG. 15 is a diagram illustrating a relationship among transmit power control, the wireless error rate, the maximum wireless communication speed corrected based on the wireless error rate, and the wired communication speed.

DESCRIPTION OF EMBODIMENTS

A communication speed bottleneck occurs in communication between a terminal and a server. In particular, with realization of the high-speed wireless communication, a communication speed bottleneck may occur in wired communication.

First Embodiment

Figure 1:
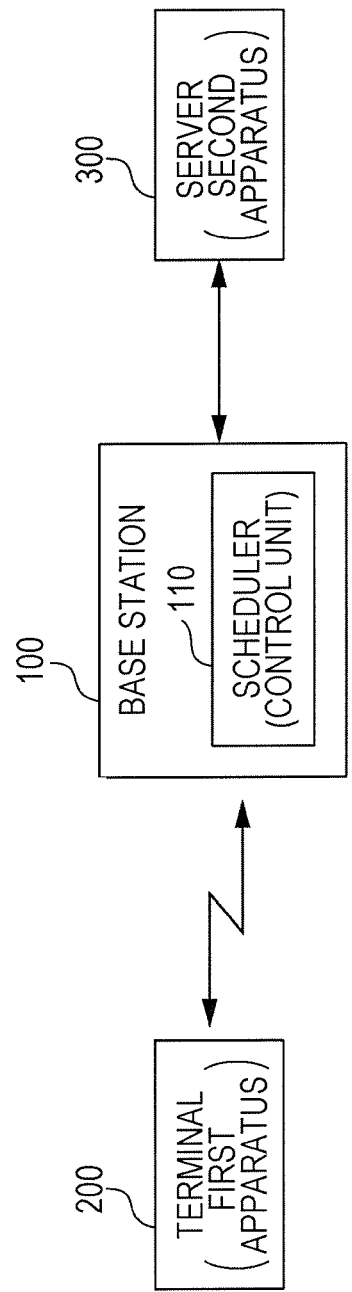
FIG. 1 is a diagram illustrating an example of a communication system, according to a first embodiment.

FIG. 1 is a diagram illustrating an example of a communication system, according to a first embodiment. In the following description of the drawings, similar components are denoted by similar references, and a duplicated description will be omitted. The communication system includes a base station 100, a terminal (first apparatus) 200 provided with a wireless communication function, and a server (second apparatus) 300 provided with a wired communication function.

Hereinafter, the terminal 200 will be also called a first apparatus, and the server 300 will be also called a second apparatus. The terminal (first apparatus) 200 will be referred to as the terminal 200 as appropriate, and the server (second apparatus) 300 will be referred to as the server 300 as appropriate.

The base station 100 performs wireless communication with the terminal (first apparatus) 200 and performs wired communication with the server (second apparatus) 300. The base station 100 includes a scheduler (control unit) 110.

Hereinafter, the scheduler (control unit) 110 will be referred to as the scheduler 110 as appropriate.

When a first communication speed corresponding to a wireless quality of the wireless communication is higher than a second communication speed of the wired communication, the scheduler 110 changes the modulation and coding scheme (MCS) to the one corresponding to the second communication speed. The scheduler 110 will be also called a control unit. Hereinafter, the modulating and coding scheme will be referred to as MCS as appropriate.

The case where the first communication speed is higher than the second communication speed corresponds to a case where a communication speed bottleneck has occurred in wired communication of communication between the terminal 200 and the server 300. In such case, the scheduler 110 changes the currently set MCS to a MCS corresponding to the aforementioned second communication speed. This consequently allows the base station 100 to perform appropriate communication control, which implies that the base station 100 communicates with the terminal 200 at a wireless communication speed complying with the wired communication speed.

Communication System

Figure 2:
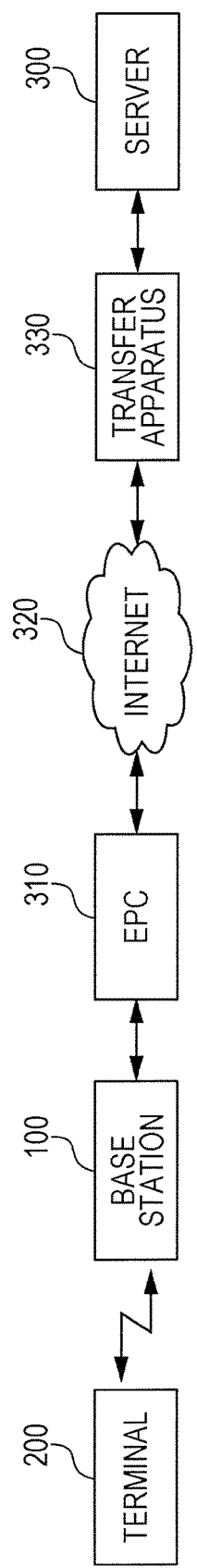
FIG. 2 is a diagram illustrating another example of a communication system, according to a first embodiment.

FIG. 2 is a diagram illustrating another example of a communication system, according to a first embodiment. The communication system illustrated in FIG. 2 is equivalent to the communication system, illustrated in FIG. 1, to which an evolved packet core (EPC) 310, Internet 320, and a transfer apparatus 330 are added.

The base station 100 performs wireless communication with the terminal 200 and performs wired communication with the EPC 310.

The terminal 200 is, for example, a portable communication terminal such as a mobile phone, a smartphone, or a tablet or laptop information processing apparatus.

The EPC 310 schematically represents a core network. The EPC 310 performs wired communication with the base station 100 and the Internet 320. The transfer apparatus 330 performs wired communication with the Internet 320 and the server 300. The transfer apparatus 330 is, for example, a router, and executes a packet routing process. The server 300 is, for example, a web server or a video server, and transmits various pieces of data to the terminal 200.

As described above, the base station 100 performs wireless communication with the terminal 200. The base station 100 also performs wired communication with the server 300 via the EPC 310, the Internet 320, and the transfer apparatus 330. Note that, in FIG. 2, the EPC 310, the Internet 320, and the transfer apparatus 330 may be omitted. In this case, the base station 100 performs wired communication with the server 300 by bypassing the EPC 310, the Internet 320, and the transfer apparatus 330.

In wireless communication in which wireless quality of a communication channel largely alters due to movement of a terminal, the base station 100 uses an error correction technique and an enhanced retransmission technique so as to realize stable wireless communication. Turbo coding is an example of the error correction technique. Automatic repeat-request (ARQ) or hybrid ARQ (HARQ) is an example of the enhanced retransmission technique.

Currently, application of High Speed Packet Access (HSPA) to wireless communication has realized high-speed communication at a communication speed of 10 Mbps or higher. The wireless communication scheme has further evolved, and the commercial use of Long Term Evolution (LTE) which aims at a communication speed of 150 to 300 Mbps has been started.

When there is a transfer delay of 10 ms in communication between the terminal 200 and the server 300, the upper limit of throughput is set to, for example, 51.2 Mbps because of window control of the network (for example, Transmission Control Protocol (TCP)).

Note that TCP throughput is a value obtained by dividing the TCP window size by a delay time up to completion of reception of one packet. The TCP window size is decided based on the performance (that is, stored size of a reception buffer) of the receiver that receives data, a load of the number of retransmitted packets, or the performance (that is, stored size of a transmission buffer) of the transmitter. Also, the delay time is decided based on a time up to when a TCP acknowledgement (ACK) response is returned. For example, in the case of the window size of 64 kbytes, the TCP throughput is 51.2 Mbps ((64 k×8 (bits)/10 ms). That is, the wired communication speed in the case of the window size of 64 kbytes is, for example, 51.2 Mbps.

Now, it is assumed that the base station 100 is a small-sized base station, for example, an LTE Femto cell, and is performing wireless communication with the terminal 200 at a wireless communication speed of 130 Mbps. In this case, a bottleneck occurs not in wireless communication but rather in wired communication when the communication is performed between the terminal 200 and the server 300. That is, the limitation of throughput emerges because the transfer delay caused not at the wireless side but rather at the backhaul side has become a bottleneck.

However, there may be cases where the cause of the transfer delay lies within wireless communication. For example, there may be a case where signal errors occur because of instantly altering wireless quality and the delay is caused as a result of retransmission processing. For example, the wireless retransmission period of LTE is 8 ms, which is not small relative to the transfer delay of wired communication. Thus, the influence of this delay is desirably taken into consideration. That is, there may be cases where a communication speed bottleneck of communication between the terminal 200 and the server 300 occurs not in wired communication but rather in wireless communication.

The base station 100 detects whether the communication speed bottleneck of communication between the terminal 200 and the server 300 has occurred in wired communication or wireless communication. When the bottleneck has occurred in wired communication, the base station 100 performs communication control of wireless communication, and communicates with the terminal 200 at a wireless communication speed according to the wired communication speed. The following describes the communication control of wireless communication performed by the base station 100 in detail.

Hardware Block Diagrams

Figure 3:
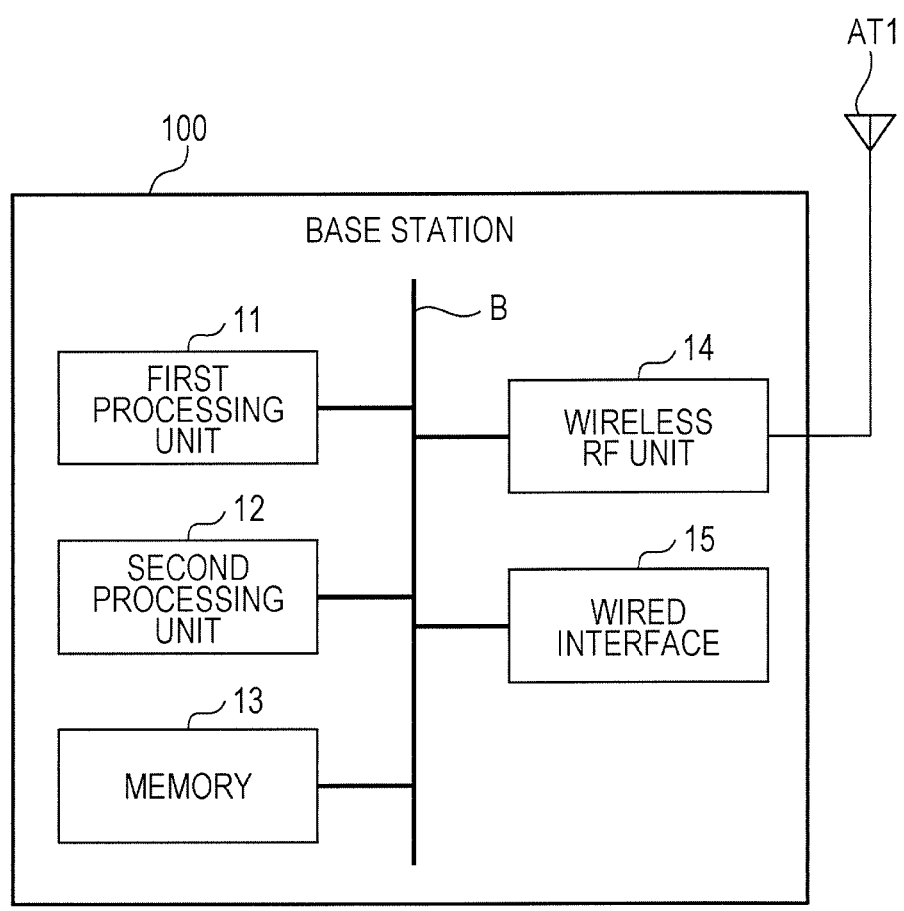
FIG. 3 is an example of a hardware block diagram of a base station illustrated in FIGS. 1 and 2, according to an embodiment.
Figure 4:
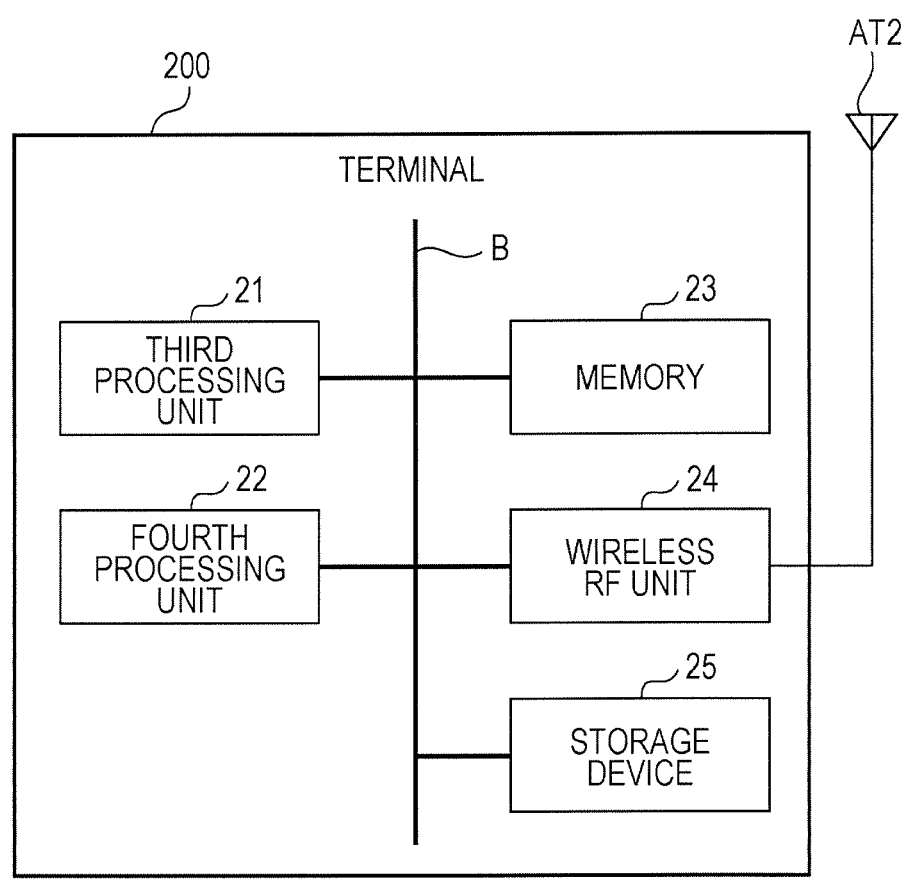
FIG. 4 is an example of a hardware block diagram of a terminal illustrated in FIGS. 1 and 2, according to an embodiment.

Referring to FIGS. 3 and 4, the hardware configurations of the base station 100 and the terminal 200 will be described.

FIG. 3 is an example of a hardware block diagram of the base station 100 illustrated in FIGS. 1 and 2. The base station 100 includes a first processing unit 11, a second processing unit 12, a memory 13, a wireless radio frequency (RF) unit 14, and a wired interface 15, which are connected to one another via a bus B, for example.

The first processing unit 11 is, for example, a central processing unit (CPU), and executes processes for controlling the base station 100. The second processing unit 12 is, for example, a digital signal processor (DSP) that performs digital signal processing. The memory 13 temporarily stores data that has been processed during various kinds of information processing executed by the first processing unit 11 and the second processing unit 12 and various programs.

The wireless RF unit 14 has a function of performing wireless communication with the terminal 200. The wireless RF unit 14 receives a transmission signal transmitted from the terminal 200 via an antenna AT1, and outputs the received signal. The wireless RF unit 14 also transmits a transmission signal to the terminal 200 via the antenna AT1.

The wired interface 15 has a function of performing wired communication with another apparatus (the EPC 310, for example). The wired interface 15 is also called an Ethernet (registered trademark) interface 15, and is a device for providing an interface used to establish a connection to an Ethernet (registered trademark)-compliant network.

FIG. 4 is an example of a hardware block diagram of the terminal 200 illustrated in FIGS. 1 and 2. The terminal 200 includes a third processing unit 21, a fourth processing unit 22, a memory 23, a wireless RF unit 24, and a storage device 25, which are connected to one another via a bus B, for example.

The third processing unit 21 is, for example, a CPU and executes processes for controlling the terminal 200. The fourth processing unit 22 is, for example, a DSP that performs digital signal processing. The memory 23 temporarily stores data that has been processed during various kinds of information processing executed by the third processing unit 21 and the fourth processing unit 22 and various programs.

The wireless RF unit 24 has a function of performing wireless communication with the base station 100. The wireless RF unit 24 receives a transmission signal transmitted from the base station 100 via an antenna AT2, and outputs the received signal. The wireless RF unit 24 also transmits a transmission signal to the base station 100 via the antenna AT2. The storage device 25 is, for example, a magnetic storage device such as a hard disk drive (HDD) or a nonvolatile memory.

Software Modules

Figure 5:
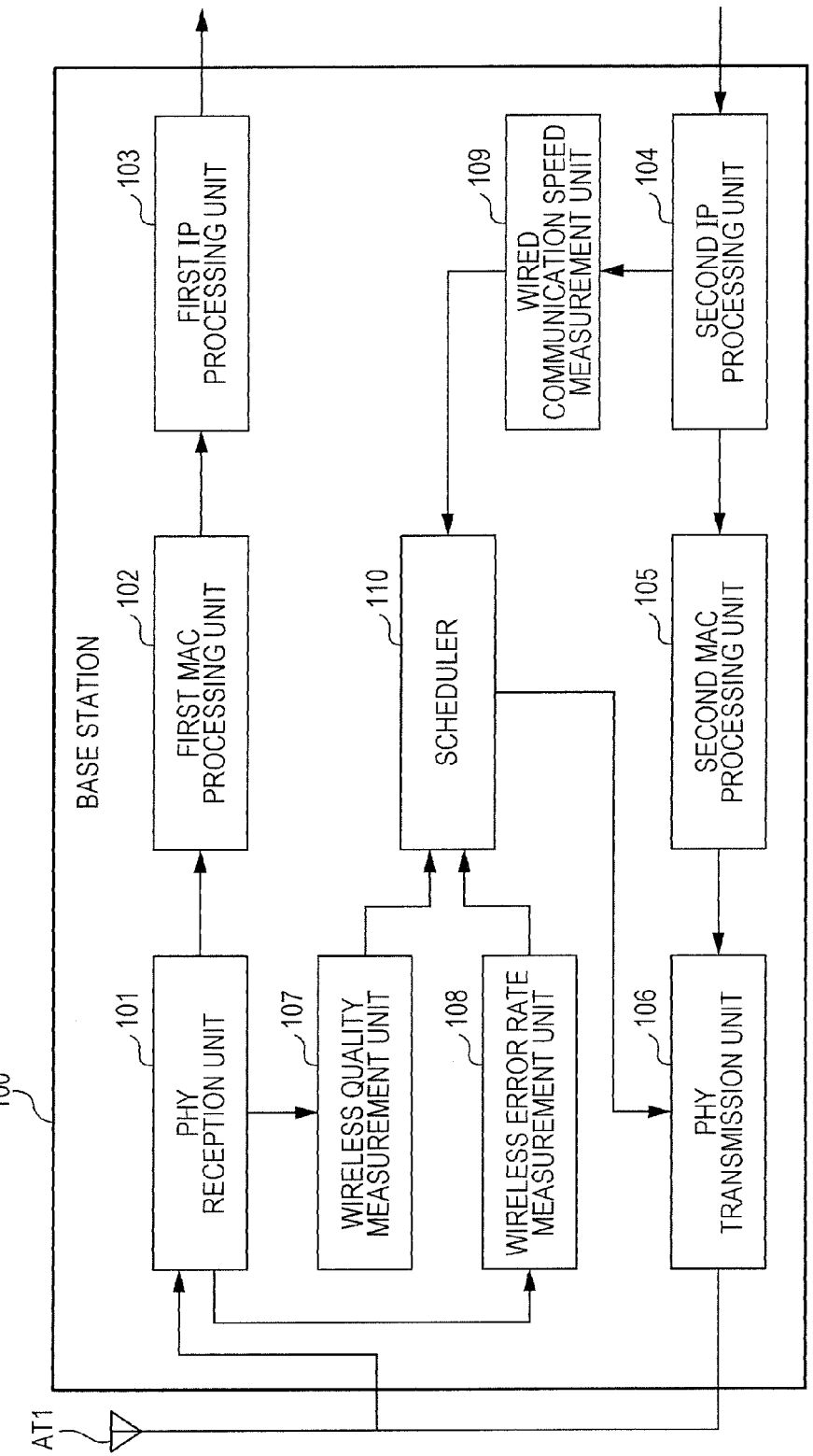
FIG. 5 is an example of a block diagram of software modules of the base station illustrated in FIGS. 1 and 2, according to an embodiment.
Figure 6:
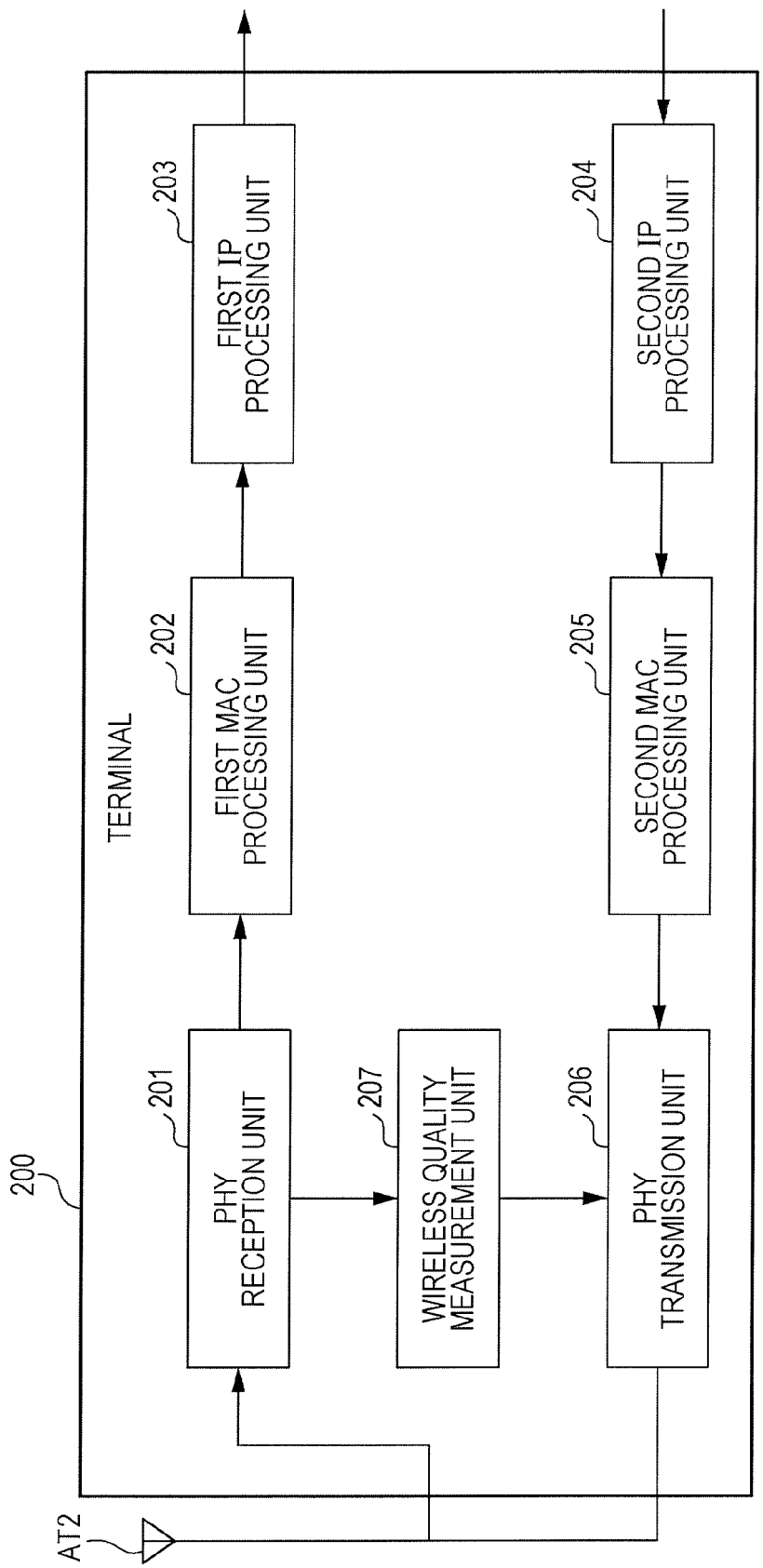
FIG. 6 is an example of a block diagram of software modules of the terminal illustrated in FIGS. 1 and 2, according to an embodiment.

Referring to FIGS. 5 and 6, the software module configurations of the base station 100 and the terminal 200 will be described.

FIG. 5 is an example of a block diagram of software modules of the base station 100 illustrated in FIGS. 1 and 2. The base station 100 includes a physical layer (PHY) reception unit 101, a first media access control (MAC) processing unit 102, a first Internet protocol (IP) processing unit 103, a second IP processing unit 104, a second MAC processing unit 105, a PHY transmission unit 106, a wireless quality measurement unit 107, a wireless error rate measurement unit 108, a wired communication speed measurement unit 109, and the scheduler 110.

The PHY reception unit 101 demodulates and decodes the received signal output by the wireless RF unit 14, and outputs the decoded signal (also called a radio frame signal) to the first MAC processing unit 102. The first MAC processing unit 102 restores an IP packet from the radio frame signal output by the PHY reception unit 101. The first IP processing unit 103 executes, based on information written in the IP header included in the IP packet restored by the first MAC processing unit 102, routing of this IP packet, and outputs the IP packet to another apparatus (the EPC 310, for example).

The second IP processing unit 104 executes checksum on an IP packet received from another apparatus (the EPC 310, for example). When the received IP packet is addressed to the base station 100, the second IP processing unit 104 outputs this IP packet to the second MAC processing unit 105. The second MAC processing unit 105 generates a radio frame from the IP packet output by the second IP processing unit 104. The PHY transmission unit 106 encodes and modulates the radio frame generated by the second MAC processing unit 105, and outputs the modulated signal via the antenna AT1.

The wireless quality measurement unit 107 extracts a channel quality indicator (CQI) included in the radio frame output by the PHY reception unit 101, and measures, based on the extracted CQI, a wireless quality to the terminal which the base station 100 is performing wireless communication with.

The wireless error rate measurement unit 108 measures a wireless error rate from the radio frame signal output by the PHY reception unit 101. Specifically, the wireless error rate measurement unit 108 counts an amount of information signal which the PHY reception unit 101 has correctly demodulated and an amount of information signal which the PHY reception unit 101 has failed to correctly demodulate so as to measure the wireless error rate. The wireless error rate measurement unit 108 is also called an error counter. Note that the wireless error rate is represented in percentage.

The wired communication speed measurement unit 109 measures a wired communication speed when the base station 100 performs wired communication with another apparatus (the EPC 310, for example). The wired communication speed is also called IP throughput. The wired communication speed represents an amount of data subjected to communication per unit time in the case where the base station 100 performs wired communication with another apparatus per unit time. The unit of the wired communication speed is bits per second (bps).

The wired communication speed measurement unit 109 measures, based on the IP packet output by the second IP processing unit 104, the wired communication speed of IP communication. Specifically, the wired communication speed measurement unit 109 measures, based on an amount of information of IP packets input to the second IP processing unit 104 per unit time (for example, one second), the wired communication speed of IP communication.

The scheduler 110 determines whether a first communication speed is higher than a second communication speed when the wireless error rate is lower than or equal to a certain percentage. When the first communication speed is higher than the second communication speed, the scheduler 110 changes the currently set MCS to the MCS corresponding to the second communication speed. The maximum wireless communication speed described in FIGS. 7 to 11 is an example of the first communication speed, and the aforementioned wired communication speed is an example of the second communication speed.

Note that the first processing unit 11 illustrated in FIG. 3 executes the first MAC processing unit 102, the first IP processing unit 103, the second IP processing unit 104, the second MAC processing unit 105, the wireless quality measurement unit 107, the wireless error rate measurement unit 108, the wired communication speed measurement unit 109, and the scheduler 110. Also, the second processing unit 12 illustrated in FIG. 3 executes the PHY reception unit 101 and the PHY transmission unit 106.

FIG. 6 is an example of a block diagram of software modules of the terminal 200 illustrated in FIGS. 1 and 2. The terminal 200 includes a PHY reception unit 201, a first MAC processing unit 202, a first IP processing unit 203, a second IP processing unit 204, a second MAC processing unit 205, a PHY transmission unit 206, and a wireless quality measurement unit 207.

The PHY reception unit 201 demodulates and decodes the received signal output by the wireless RF unit 24, and outputs the resulting radio frame signal to the first MAC processing unit 202. The first MAC processing unit 202 restores an IP packet from the radio frame signal output by the PHY reception unit 201. The first IP processing unit 203 executes, based on information written in the IP header included in the IP packet restored by the first MAC processing unit 202, routing of this IP packet, and outputs the IP packet to a higher-layer application (not illustrated) corresponding to this information.

The second IP processing unit 204 executes checksum on an IP packet received from a higher-layer application (not illustrated), and outputs this IP packet to the second MAC processing unit 205. The second MAC processing unit 205 generates a radio frame from the IP packet output by the second IP processing unit 204. The PHY transmission unit 206 encodes and modulates the radio frame generated by the second MAC processing unit 205, and outputs the modulated signal via the antenna AT2.

The wireless quality measurement unit 207 measures, based on the radio frame signal output by the PHY reception unit 201, a wireless quality. The wireless quality measurement unit 207 measures, for example, the signal to interference plus noise ratio (SINR) of wireless communication performed with the base station 100, determines the CQI based on the measured SINR, and outputs the determined CQI to the PHY transmission unit 206. The PHY transmission unit 206 sets the CQI input from the wireless quality measurement unit 207 in a predetermined region of the radio frame output by the second MAC processing unit 205, and encodes and modulates the CQI-set radio frame.

Note that the third processing unit 21 illustrated in FIG. 4 executes the first MAC processing unit 202, the first IP processing unit 203, the second IP processing unit 204, the second MAC processing unit 205, and the wireless quality measurement unit 207. Also, the fourth processing unit 22 illustrated in FIG. 4 executes the PHY reception unit 201 and the PHY transmission unit 206.

Flow of MCS Selection Process

Figure 7:
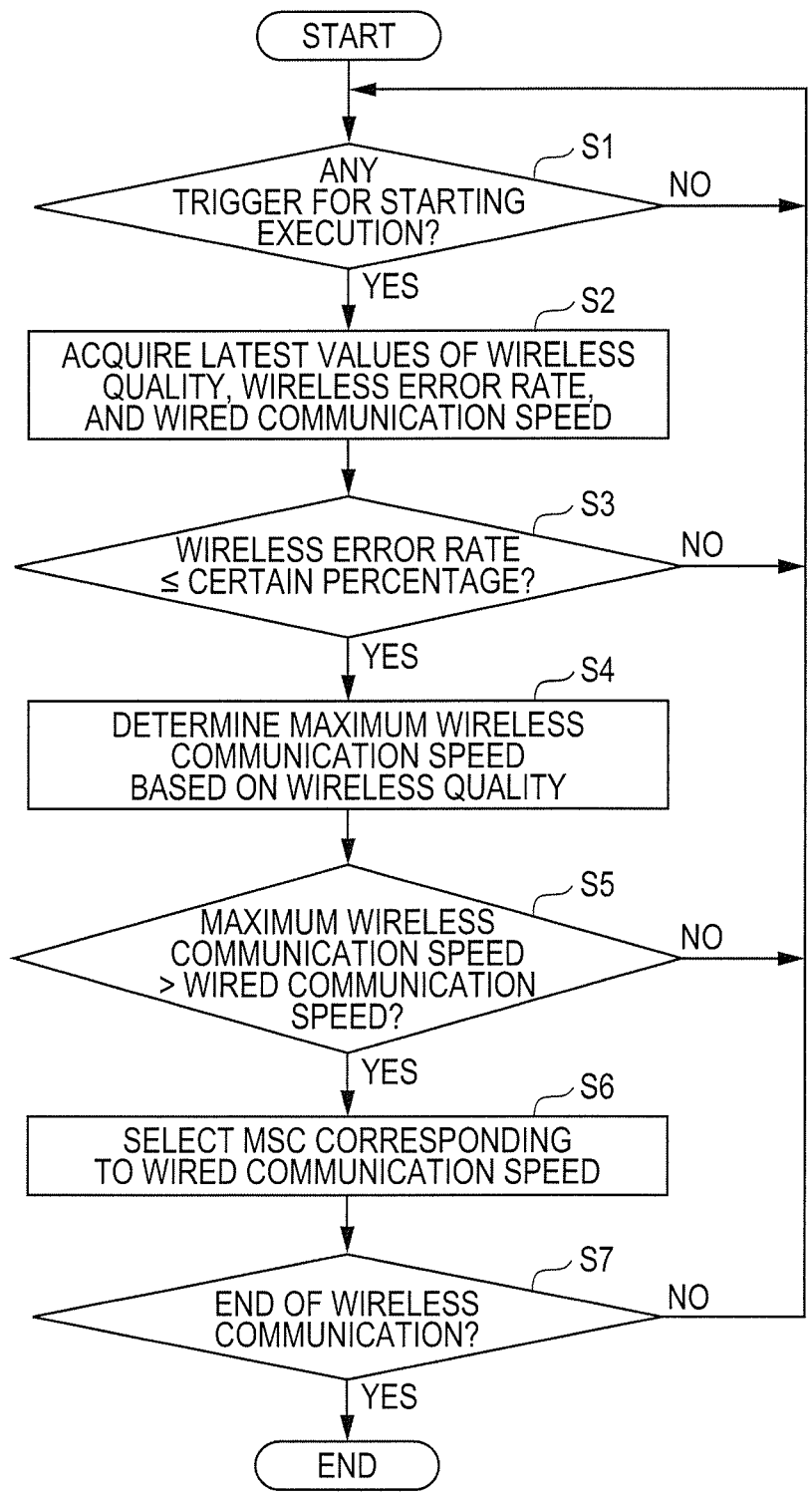
FIG. 7 is an example of a flowchart describing the flow of a modulation and coding scheme (MCS) selection process, according to a first embodiment.

FIG. 7 is an example of a flowchart describing the flow of an MCS selection process according to the first embodiment.

In step S1, the scheduler 110 determines whether a trigger to start execution of the MCS selection process has occurred. Specifically, the trigger is, for example, elapse of a certain period, handover performed by the terminal 200, or reception of a certain number of CQIs from the terminal 200. Note that the certain period is, for example, one second or one hundred milliseconds. The certain number of CQIs is, for example, ten CQIs.

When the trigger to start execution of the MCS selection process has occurred (YES in step S1), the process proceeds to step S2.

In step S2, the scheduler 110 acquires the latest values of the wireless quality, the wireless error rate, and the wired communication speed. Specifically, the scheduler 110 acquires the wireless quality measured by the wireless quality measurement unit 107. The scheduler 110 also acquires the wireless error rate measured by the wireless error rate measurement unit 108. The scheduler 110 also acquires the wired communication speed measured by the wired communication speed measurement unit 109.

In step S3, the scheduler 110 determines whether the wireless error rate acquired in step S2 is lower than or equal to a certain percentage. When the wireless error rate is lower than or equal to the certain percentage (YES in step S3), the process proceeds to step S4.

Here, the certain percentage is, for example, 0%. In the case where the certain percentage is 0%, the scheduler 110 determines YES in step S3 when the wireless error rate is 0% and determines NO in step S3 when the wireless error rate exceeds 0%. Note that when the certain percentage is set to be 0%, the scheduler 110 determines whether wireless errors have occurred in step S3. In this case, when the wireless error rate is 0%, it is determined no wireless error has occurred. When the wireless error rate exceeds 0%, it is determined that wireless errors have occurred. Note that when the certain percentage is set to be 0%, the wireless error rate being lower than or equal to the certain percentage equates to the wireless error rate being equal to 0%.

In step S4, the scheduler 110 determines the maximum wireless communication speed from the wireless quality acquired in step S2. Here, the maximum wireless communication speed refers to a maximum wireless communication speed at which the base station 100 may perform wireless communication with the terminal 200 by using the currently set MCS. The wireless communication speed represents an amount of data subjected to communication per unit time when the base station 100 performs wireless communication with another apparatus (for example, the terminal 200). The unit of the wireless communication speed is bits per seconds (bps). The wireless communication speed is also called a wireless rate or wireless throughput. How the maximum wireless communication speed is determined will be described below with reference to FIGS. 8 to 11.

In step S5, the scheduler 110 determines whether the maximum wireless communication speed calculated in step S4 is higher (larger) than the wired communication speed acquired in step S2. When the maximum wireless communication speed is higher than the wired communication speed (YES in step S5), the process proceeds to step S6.

In step S6, the scheduler 110 selects an MCS corresponding to the wired communication speed acquired in step S2. The scheduler 110 then outputs the selected MCS to the PHY transmission unit 106. The PHY transmission unit 106 sets the MCS input from the scheduler 110 in a predetermined region of the radio frame generated by the second MAC processing unit 105, and encodes and modulates the MCS-set radio frame. Then, the PHY transmission unit 106 transmits the modulated signal to the terminal 200 via the antenna AT1. Also, the PHY transmission unit 106 changes the current modulation scheme to the modulation scheme corresponding to the MCS input from the scheduler 110, and also changes the current coding rate to the coding rate corresponding to the selected MCS. That is, the scheduler 110 changes the currently set MCS to the MCS corresponding to the wired communication speed.

In step S7, the scheduler 110 determines whether wireless communication has ended. When wireless communication has ended (YES in step S7), the scheduler 110 terminates the MCS selection process.

When no trigger to start execution of the MCS selection process has occurred (NO in step S1), the scheduler 110 continuously performs the processing of step S1. When the wireless error rate is higher than the certain percentage (NO in step S3), the process returns to step S1. When the maximum wireless communication speed is lower than or equal to the wired communication speed (NO in step S5), the process returns to step S1. When wireless communication has not ended (NO in step S7), the process returns to step S1.

Tables

Tables which the scheduler 110 refers to when determining the maximum wireless communication speed and selecting the MCS will be described.

Figure 8:
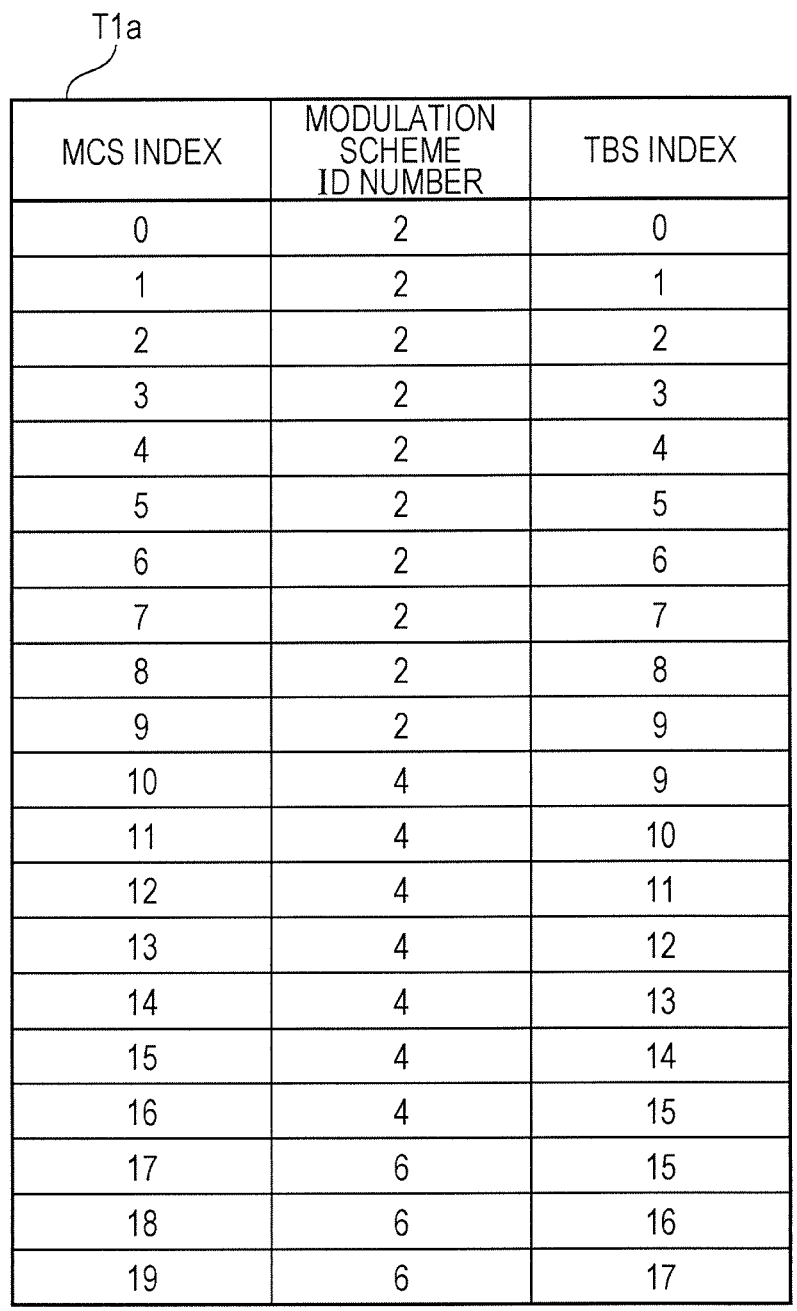
FIG. 8 is an example of a first table that determines a transport block size (TBS) index used when a scheduler determines the maximum wireless communication speed and selects the MCS, according to an embodiment.
Figure 9:
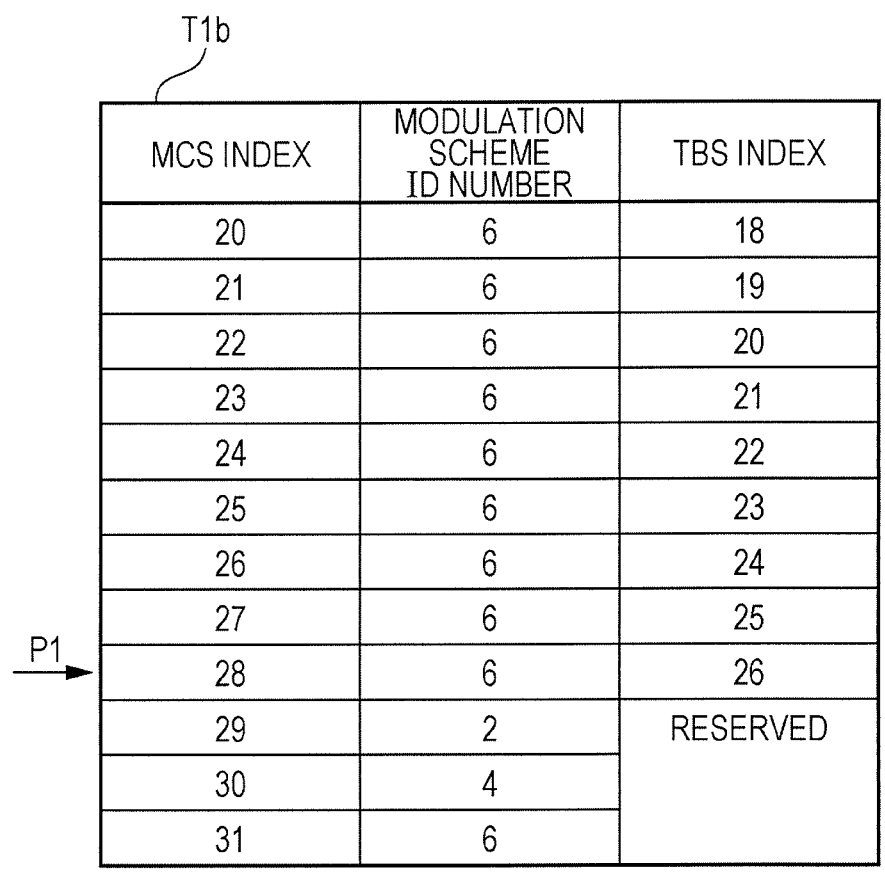
FIG. 9 is an example of a second table that determines a TBS index used when the scheduler determines the maximum wireless communication speed and selects the MCS, according to an embodiment.

FIG. 8 is an example of a first table that determines a transport block size (TBS) index which is used when the scheduler 110 determines the maximum wireless communication speed and selects the MCS. FIG. 9 is an example of a second table that determines a TBS index which is used when the scheduler 110 determines the maximum wireless communication speed and selects the MCS. Note that TBS is the abbreviation of transport block size.

A TBS index table T1a illustrated in FIG. 8 and a TBS index table T1b illustrated in FIG. 9 each include an MCS index field, a modulation scheme identification (ID) number field, and a TBS index field. The TBS index table T1b illustrated in FIG. 9 is a table that follows the TBS index table T1a illustrated in FIG. 8.

The MCS index field stores the number identifying the MCS. In the TBS index tables T1a and T1b, the MCS index field stores any of the numbers of 1 to 31.

The modulation scheme ID number field stores the number identifying the modulation scheme. In the TBS index tables T1a and T1b, the modulation scheme ID number field stores 2, 4, or 6. The modulation scheme ID number of 2 represents quadrature phase shift keying (QPSK). The modulation scheme ID number of 4 represents 16 quadrature amplitude modulation (16QAM). The modulation scheme ID number of 6 represents 64QAM.

Figure 11:
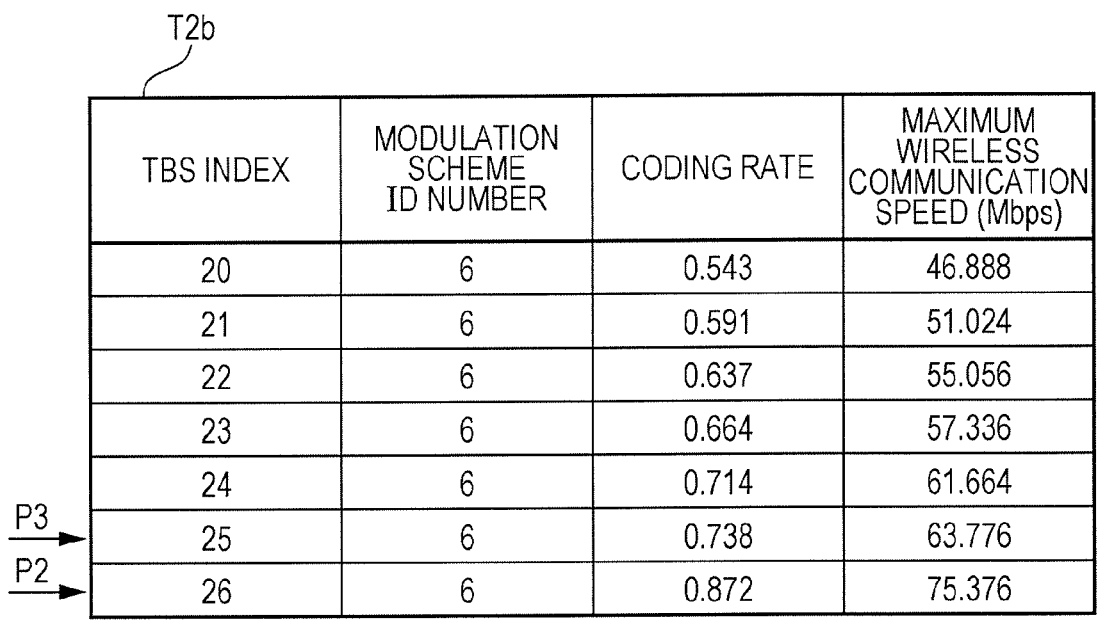
FIG. 11 is an example of a second table referred to when the scheduler decides the maximum wireless communication speed and selects the MCS, according to an embodiment.

The TBS index field stores the number identifying a record stored in a table that describes the maximum wireless communication speed decision process and the MCS selection process described in FIGS. 10 and 11. The TBS index field stores any of the numbers of 0 to 26.

Referring to FIGS. 8 and 9, the individual numbers stored in one row are associated with one another. For example, the MCS index of 1 stored in the MCS index field illustrated in FIG. 8, the modulation scheme ID number of 2, and the TBS index of 1 are associated with one another.

FIG. 10 is an example of a first table which the scheduler 110 refers to when determining the maximum wireless communication speed and selecting the MCS. FIG. 11 is an example of a second table which the scheduler 110 refers to when determining the maximum wireless communication speed and selecting the MCS.

A radio resource table T2a illustrated in FIG. 10 and a radio resource table T2b illustrated in FIG. 11 each include a TBS index field, a modulation scheme ID number field, a coding rate field, and a maximum wireless communication speed field.

The TBS index field stores a TBS index which is the same as that stored in the TBS index field of the TBS index tables T1a and T1b illustrated in FIGS. 8 and 9. The modulation scheme ID number field stores a modulation scheme ID number which is the same as that stored in the modulation scheme ID number field of the TBS index tables T1a and T1B illustrated in FIGS. 8 and 9. The coding rate field stores a coding rate. The maximum wireless communication speed field stores the maximum wireless communication speed of wireless communication performed with the terminal. The maximum wireless communication speed illustrated in FIGS. 10 and 11 represents the maximum wireless communication speed to be achieved when the base station 100 performs wireless communication with the terminal 200 using the modulation scheme identified by the modulation scheme ID number stored in the modulation scheme ID number field and the coding rate stored in the coding rate field.

The individual numbers stored in one row of the radio resource table T2a illustrated in FIG. 10 and the radio resource table T2b illustrated in FIG. 11 are associated with one another. For example, the TBS index of 1, the modulation scheme ID number of 2, the coding rate of 0.126, and the maximum wireless communication speed of 3.624 illustrated in FIG. 10 are associated with one another.

That is, the maximum wireless communication speed to be achieved when the base station 100 performs wireless communication with the terminal 200 using QPSK represented by the modulation scheme ID number of 2 and the coding rate of 0.126 is 3.624 Mbps.

Note that the TBS index table T1a illustrated in FIG. 8, the TBS index table T1b illustrated in FIG. 9, the radio resource table T2a illustrated in FIG. 10, and the radio resource table T2b illustrated in FIG. 11 are stored in, for example, the memory 13 of the base station 100 illustrated in FIG. 3. Alternatively, these tables may be stored in a storage device (not illustrated) provided in the base station 100 illustrated in FIG. 3.

Specific Example

Referring to FIGS. 2 to 11, a specific example of the MCS selection process according to the first embodiment will be described. The scheduler 110 acquires the latest values of the wireless quality, the wireless error rate, and the wired communication speed (step S2).

The scheduler 110 determines whether the wireless error rate acquired in step S2 is lower than or equal to a certain percentage (step S3). Now, suppose that the certain percentage is 0 and the wireless error rate is 0. In this case, the scheduler 110 determines YES in step S3.

The scheduler 110 determines the maximum wireless communication speed from the wireless quality (step S4). Now, the wireless quality will be described. The wireless quality is determined based on the CQI received from the terminal 200.

First, the wireless quality measurement unit 107 extracts the CQI set in the radio frame output by the PHY reception unit 101. The wireless quality measurement unit 107 determines the CQI using a plurality of CQIs extracted in the past (also called a CQI history). As the usage of the CQI history, a simple average, a weighted average obtained by weighting new CQI, or the like is often used.

In the following specific example, the terminal 200 sets, as the CQI, a CQI index in a radio frame and transmits the radio frame to the base station 100. The CQI index is, for example, any of ID numbers of 0 to 15. The CQI indices of 1 to 15 are stored in the terminal 200 in association with different SINRs. The CQI index corresponds to the MCS index.

The wireless quality measurement unit 107 calculates, for example, a simple average (hereinafter, referred to as a CQI average value) of a plurality of CQI indices that have already been received, and outputs the CQI average value to the scheduler 110.

The scheduler 110 uses the CQI history to determine the MCS index as a MCS (also called a communication format).

The scheduler 110 extends the CQI average value in accordance with the range of the MCS index.

Equation representing this extension is denoted by Equation 1.

$$\text{Extended CQI average value} = (\text{Total number of MCS indices}/\text{Total number of CQI indices}) \times \text{CQI average value} \quad \text{(Equation 1)}$$

Here, a value after the decimal point is round down. In the case of the example illustrated in FIGS. 8 and 9, the total number of MCS indices is 32 (0 to 31). Also, in the aforementioned case, the total number of CQI indices is 16 (0 to 15). For example, in the case where the CQI average value is 14, the extended CQI average value is 28 ((32/16)× 14).

Then, the scheduler 110 selects a row storing the MCS index which is the same as the extended CQI average value from the TBS index tables T1a and T1b illustrated in FIGS. 8 and 9. In the case where the extended CQI average value is 28, the scheduler 110 selects a row (see a row P1) storing the MCS index of 28 from the TBS index table T1b illustrated in FIG. 9. Then, the scheduler 110 selects the TBS index number from the selected row. In the example of the row P1, the scheduler 110 selects 26 as the TBS index number.

Subsequently, the scheduler 110 selects a row storing the selected TBS index from the radio resource tables T2a and T2b illustrated in FIGS. 10 and 11. In the case where the TBS index is 26, the scheduler 110 selects a row storing the TBS index of 26 (see a row P2) from the radio resource table T2b illustrated in FIG. 11. Then, the scheduler 110 selects the value of the maximum wireless communication speed from the selected row.

In the example of the row P2 illustrated in FIG. 11, the scheduler 110 selects 75.376 as the value of the maximum wireless communication speed. Through the above process, the scheduler 110 determines the maximum wireless communication speed (step S4).

The scheduler 110 determines whether the calculated maximum wireless communication speed is higher than the wired communication speed acquired in step S2 (step S5). It is assumed here that the wired communication speed acquired in step S2 is 64 Mbps. In the aforementioned example, the maximum wireless communication speed determined in step S4 is 75.376 Mbps and the wired communication speed is 64 Mbps. Thus, the scheduler 110 determines YES (75.376 Mbps>64 Mbps) in step S5.

The scheduler 110 selects the MCS corresponding to the wired communication speed acquired in step S2 (step S6). Specifically, the scheduler 110 selects a row storing the maximum wireless communication speed which is closest to the wired communication speed acquired in step S2 from among the maximum wireless communication speeds stored in the maximum wireless communication speed field of the radio resource tables T2a and T2b illustrated in FIGS. 10 and 11. Then, the scheduler 110 selects the modulation scheme ID number and the coding rate from the selected row.

In the aforementioned example, the wired communication speed is 64 Mbps. The maximum wireless communication speed that is closest to the wired communication speed of 64 Mbps among the maximum wireless communication speeds stored in the maximum wireless communication speed field of the radio resource tables T2a and T2b illustrated in FIGS. 10 and 11, is 63.776 Mbps (see a row P3 of FIG. 11). The scheduler 110 selects the modulation scheme ID number of 6 and the coding rate of 0.738 from the row storing the maximum wireless communication speed of 63.776 Mbps. In the aforementioned example, the modulation scheme ID number of 6 and the coding rate of 0.738 selected by the scheduler 110 are the MCS corresponding to the wired communication speed of 64 Mbps.

Then, the scheduler 110 outputs the selected modulation scheme ID number of 6 and the selected coding rate of 0.738 to the PHY transmission unit 106. The PHY transmission unit 106 changes the current modulation scheme to 64QAM, which is the modulation scheme corresponding to the modulation scheme ID number of 6. Also, the PHY transmission unit 106 changes the current coding rate to the coding rate of 0.738.

Further, the PHY transmission unit 106 sets the modulation scheme ID number of 6 and the coding rate of 0.738 in a predetermined region of a radio frame, executes various kinds of processing such as modulation processing on this radio frame, and transmits the resulting radio frame to the terminal 200 via the antenna AT1.

The base station 100 includes a memory for storing, for example, information associating the wireless quality and the communication speed with each other in order to execute the above-described MCS selection process. The memory is, for example, the memory 13 illustrated in FIG. 3 or a storage device (not illustrated). The information further associates the wireless quality, the communication speed, and the MCS with one another.

An example of the wireless quality contained in the information is the MCS index corresponding to the CQI index described in FIGS. 8 and 9. Also, an example of the communication speed contained in the information is the maximum wireless communication speed described in FIGS. 10 and 11. Also, an example of the MCS contained in the information is the modulation scheme ID number and coding rate described in FIGS. 10 and 11.

The scheduler 110 selects a communication speed associated with the wireless quality of wireless communication performed with the terminal 200 from the information, and determines the selected communication speed as a first communication speed (for example, the maximum wireless communication speed). The scheduler 110 changes the currently set MCS to a MCS associated with the communication speed that is closest to a second communication speed (for example, the wired communication speed).

According to the first embodiment, when the wireless error rate is lower than or equal to a certain percentage (see step S3 of FIG. 7), the base station 100 assumes a possibility of a communication speed bottleneck of communication between the terminal 200 and the server 300 having occurred in wireless communication is low. Thus, the base station 100 executes processing of step S4 and following steps.

The base station 100 determines whether the communication speed bottleneck has occurred in wireless communication in step S3 of FIG. 7. The wireless error rate acquisition processing is processing to be performed by the base station 100 to execute an ordinary communication process. Therefore, the wireless error rate is not acquired only for MCS selection. As a result, a processing load of the determination may be reduced.

Further, when the maximum wireless communication speed is higher than the wired communication speed (see step S5), the base station 100 assumes that the communication speed bottleneck has occurred in wired communication and executes processing of step S6 and following step. That is, the base station 100 determines whether the communication speed bottleneck has occurred in wired communication through processing of step S5.

Through the above-described two-step determination process of steps S3 and S5, the base station determines whether the communication speed bottleneck has occurred in wired communication or wireless communication at a high accuracy. Accordingly, the base station 100 may suppress execution of the unnecessary MCS selection process resulting from erroneous determination.

According to the first embodiment, the base station 100 determines whether the communication speed bottleneck has occurred in wired communication or wireless communication. When the communication speed bottleneck has occurred in wired communication, the base station 100 selects the MCS corresponding to the wired communication speed. As a result, the base station 100 may reduce its power consumption.

Specifically, when the communication speed bottleneck has occurred in wired communication, the base station 100 may adjust the wireless communication speed to the one according to the wired communication speed. Accordingly, the base station 100 no longer executes wasteful radio resource and data processing. As a result, the base station 100 may reduce wasteful power consumption.

For example, a case is assumed in which the communication speed bottleneck has occurred in wired communication. In order to perform communication using a preset MCS, the base station attaches redundant information such as padding (referred to as redundant information as appropriate) to information that is required to be transmitted from the base station to the terminal (referred to as required information as appropriate), and transmits a signal containing the required information and the redundant information to the terminal. The amount of this redundant information increases in proportion to the magnitude of the difference between the wired communication speed and the wireless communication speed. That is, the larger the difference between the wired communication speed and the wireless communication speed, the larger the amount of redundant information attached to the required information. As a result, a load of information processing and power consumption of the base station increase owing to addition of unnecessary redundant information.

However, according to the first embodiment, in the case where the communication speed bottleneck has occurred in wired communication, the wireless communication speed is set to be close to the wired communication speed by selecting the MCS according to the wired communication speed. Consequently, the amount of redundant information added to the required information may be reduced. In other words, redundancy such as padding may be minimized. As a result, an increase in a load of information processing in the base station may be suppressed by reducing the amount of added redundant information and unnecessary power consumption may be reduced.

Also, according to the first embodiment, only when the maximum wireless communication speed is higher than the wired communication speed, the MCS according to the wired communication speed is selected. In other words, when the maximum wireless communication speed is not higher than the wired communication speed, the above-described MCS selection is not performed. Accordingly, a processing load of the base station may be reduced. Further, as a result of reduction in the processing load, the base station 100 may reduce its power consumption.

Also, according to the first embodiment, the terminal 200 receives a signal containing a decreased amount of redundant information, and decodes this received signal. Accordingly, the terminal 200 may reduce an information processing load of a process of decoding the received signal. Because the information processing load may be reduced in this way, power consumption of the terminal 200 may be reduced. In particular, when the terminal 200 is a mobile terminal that operates with a battery, the operation time may be increased by reducing power consumption.

Second Embodiment

The base station 100 described in the first embodiment performs the MCS selection process according to the wired communication speed so as to reduce the wireless communication speed. For example, the base station 100 changes the modulation scheme from 64QAM to 16QAM. Also, the base station 100 reduces the coding rate. As a result, robustness against wireless errors is increased in wireless communication, and redundancy is also caused in transmit power of the base station 100. In other words, as robustness against wireless errors increases, the wireless error rate lowers even if transmit power of the base station 100 is reduced, compared with the wireless error rate acquired before the reduction of transmit power of the base station 100.

Here, transmit power represents amplitude of a modulated signal. The amplitude of the modulated signal is equivalent to a distance between the origin and the point of the modulated signal in a diagram (constellation diagram) representing the modulation scheme using polar coordinates.

Redundant transmit power not only increases power consumption of the base station 100 but also causes interference to other cells of the base station 100 or a terminal located within a cell of another base station.

Accordingly, after changing the currently set MCS to a MCS according to the wired communication speed (see the first embodiment), the scheduler 110 of the base station 100 performs transmit power control of a wireless signal of wireless communication so as to reduce (lower) transmit power. The scheduler 110 reduces transmit power of a wireless signal while maintaining the wireless error rate of wireless communication performed at the reduced transmit power, lower than or equal to a certain percentage (for example, 0%).

Figure 12:
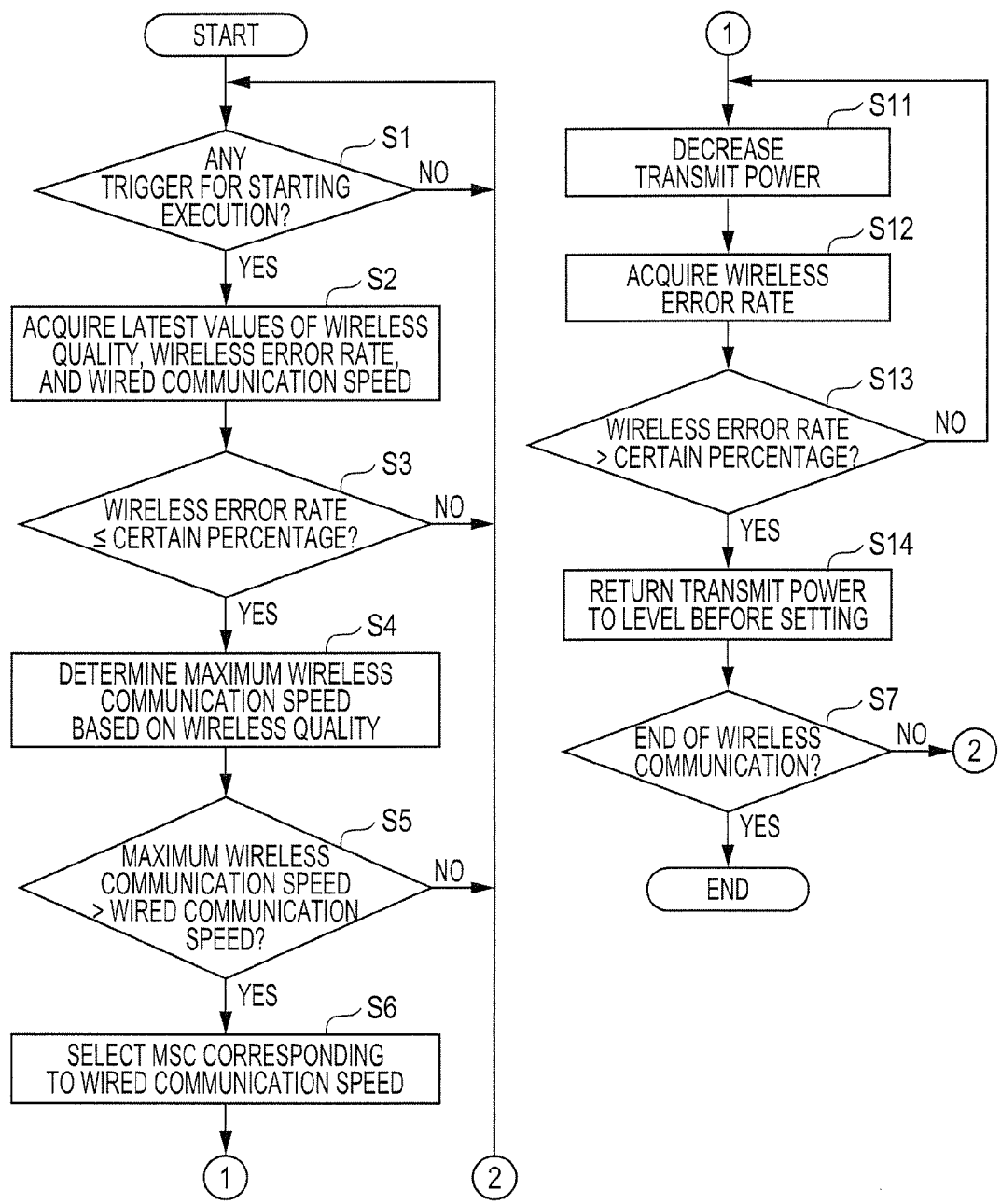
FIG. 12 is an example of an operational flowchart describing the flow of an MCS selection process and a transmit power control process, according to a second embodiment.

FIG. 12 is an example of a flowchart describing the flow of an MCS selection process and a transmit power control process according to the second embodiment. In the flowchart illustrated in FIG. 12, steps S11 to S14 are inserted between steps S6 and S7 described in FIG. 7. Specifically, after the processing of step S6, processing of steps S11 to S14 is sequentially executed. Then, after the processing of step S14, the processing of step S7 is executed.

In step S11, the scheduler 110 reduces transmit power. Specifically, the scheduler 110 instructs the PHY transmission unit 106 to reduce the currently set transmit power by a certain amount of power. In response to this instruction, the PHY transmission unit 106 sets a transmit power (for example, 9 dBm) by reducing the currently set transmit power (for example, 10 dBm) by a certain amount of power. The certain amount of power is, for example, 1 dBm, and hereinafter it is assumed that the certain amount of power is 1 dBm.

In step S12, the scheduler 110 acquires the latest value of the wireless error rate. Specifically, the scheduler 110 acquires the wireless error rate measured by the wireless error rate measurement unit 108.

In step S13, the scheduler 110 determines whether the wireless error rate acquired in step S12 has exceeded a certain percentage. Here, the certain percentage is, for example, 0%. When the wireless error rate has not exceeded the certain percentage (NO in step S13), the process returns to step S11. When the wireless error rate has exceeded the certain percentage (YES in step S13), the process proceeds to step S14.

In step S14, the scheduler 110 returns the currently set transmit power to the transmit power set before the reduction. Specifically, the scheduler 110 instructs the PHY transmission unit 106 to increase the currently set transmit power by a certain amount of power. In response to this instruction, the PHY transmission unit 106 sets a transmit power (for example, 10 dBm) by increasing the currently set transmit power (for example, 9 dBm) by a certain amount of power (for example, 1 dBm).

As described above, the scheduler 110 reduces transmit power of a wireless signal in units of certain amounts of power (step S11, NO in step S13). Then, when the wireless error rate of wireless communication performed at the reduced transmit power has exceeded the certain percentage (YES in step S13), the scheduler 110 increases, by the certain amount of power, the transmit power of the wireless signal set when the wireless error rate has exceeded the certain percentage, and performs wireless communication at the increased transmit power (step S14).

Specific Example

Referring to FIGS. 12 and 13, a specific example of the transmit power control process according to the second embodiment will be described.

FIG. 13 is an example of a diagram illustrating a relationship between transmit power control and the wireless error rate. A transmit power field records transmit power set by the PHY transmission unit 106. A wireless error rate field records a wireless error rate measured by the wireless error rate measurement unit 108 when this transmit power is set.

In the following description, the scheduler 110 executes steps S1 to S6 which have been described in the specific example of the first embodiment. As a result, the PHY transmission unit 106 changes the current modulation scheme to 64QAM which is a modulation scheme corresponding to the modulation scheme ID number of 6 (see the row P3 of FIG. 11). Also, the PHY transmission unit 106 changes the current coding rate to a coding rate of 0.738 (see the row P3 of FIG. 11).

Also, it is assumed that the current transmit power is 10 dBm and the wireless error rate is 0% (see a row P11 of FIG. 13).

The scheduler 110 instructs the PHY transmission unit 106 to reduce the currently set transmit power by the certain amount of power (step S11). In response to this instruction, the PHY transmission unit 106 sets a transmit power at 9 dBm by reducing the currently set transmit power 10 dBm by the certain amount of power 1 dBm. It is assumed that the wireless error rate at the transmit power of 9 dBm is 0%. In this case, the scheduler 110 executes the processing of steps S12 and S13, and determines NO in step S13. The process then returns to step S11.

The scheduler 110 instructs the PHY transmission unit 106 to reduce the currently set transmit power by the certain amount of power (step S11). In response to this instruction, the PHY transmission unit 106 sets a transmit power at 8 dBm by reducing the currently set transmit power 9 dBm by the certain amount of power 1 dBm. It is assumed that the wireless error rate at the transmit power of 8 dBm is 0%. In this case, the scheduler 110 executes the processing of steps S12 and S13, and determines NO in step S13. The process then returns to step S11.

The scheduler 110 repeatedly performs the above-described processing of steps S11 to S13, and reduces the transmit power from 9 dBm to 5 dBm (see rows P12 of FIG. 13). Here, it is assumed that the wireless error rate at the transmit powers of 8 to 5 dBm is 0%. Also, it is assumed that the wireless error rate at the transmit power of 4 dBm is 4%.

The scheduler 110 performs the above-described processing of steps S11 to S13 to reduce the transmit power to 4 dBm. The scheduler 110 acquires the wireless error rate, which is 4% (see a row P13 of FIG. 13) (step S12), and determines that this wireless error rate (4%) has exceeded the certain percentage (0%) (YES in step S13). Then, the process proceeds to step S14.

The scheduler 110 instructs the PHY transmission unit 106 to increase the currently set transmit power 4 dBm by the certain amount of power 1 dBm. In response to this instruction, the PHY transmission unit 106 sets the transmit power at 5 dBm by increasing the currently set transmit power 4 dBm by the certain amount of power 1 dBm. Note that the wireless error rate at this transmit power 5 dBm is 0%.

Through the above-described process, the scheduler 110 sets the minimum transmit power with which the wireless error rate may be maintained at 0%.

According to the second embodiment, transmit power of a base station may be set to the minimum transmit power with which the wireless error rate may be maintained at 0%. The wireless error rate of 0% indicates that the quality of wireless communication is excellent.

As a result, transmit power may be reduced while maintaining the quality of wireless communication excellent. Also, interference to another cell of the base station or a terminal located within a cell of another base station may be suppressed.

Third Embodiment

In a third embodiment, as in the second embodiment, transmit power control is performed in addition to the MCS selection process described in the first embodiment. The scheduler 110 of the base station 100 according to the third embodiment reduces transmit power of a wireless signal while maintaining the wireless-error-corrected maximum wireless communication speed higher than the wired communication speed.

Figure 14:
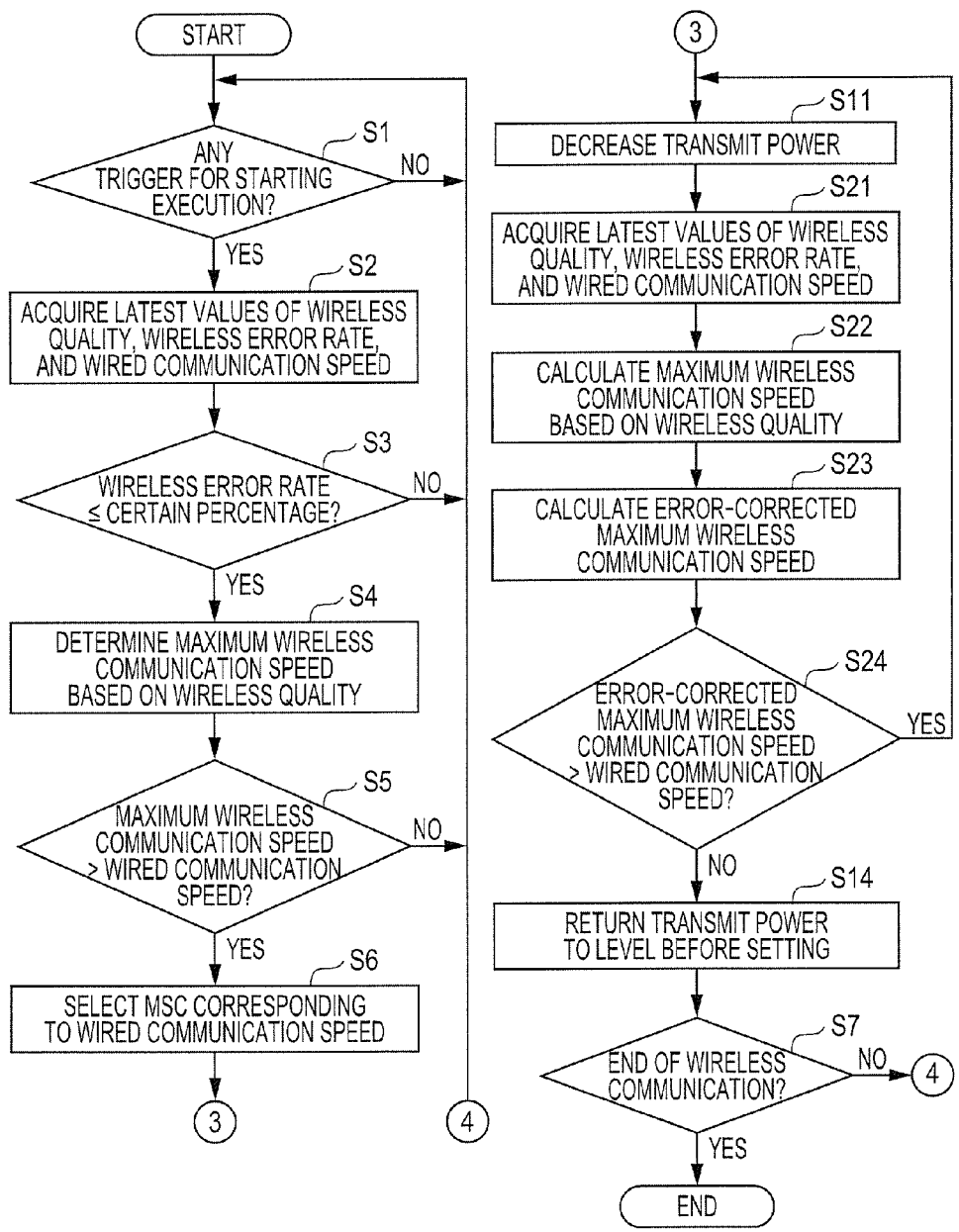
FIG. 14 is an example of an operational flowchart describing the flow of an MCS selection process and a transmit power control process, according to a third embodiment.

FIG. 14 is an example of a flowchart describing the flow of an MCS selection process and a transmit power control process according to the third embodiment. In the flowchart illustrated in FIG. 14, steps S21 to S24 are inserted between steps S11 and S14 described in FIG. 12. That is, after the processing of step S11, processing of steps S21 to S24 is sequentially executed. Then, after the processing of step S24, the processing of step S14 is executed.

In step S21, the scheduler 110 acquires the latest values of the wireless quality, the wireless error rate, and the wired communication speed. A detailed description of step S21 is omitted because it has been given in step S2 of FIG. 7 and the specific example of the first embodiment.

In step S22, the scheduler 110 determines the maximum wireless communication speed from the wireless quality acquired in step S21. A detailed description of step S22 is omitted because it has been given in step S4 of FIG. 7 and the specific example of the first embodiment.

In step S23, the scheduler 110 calculates the wireless-error-corrected maximum wireless communication speed. Equation used to calculate the maximum wireless communication speed corrected based on the error rate is denoted by Equation 2 below.

Wireless-error-corrected maximum wireless communication speed=

$$(100-\text{Wireless error rate acquired in step } S21) \times \\ \text{Maximum wireless communication speed calculated in step } S22 \times 0.01 \quad \text{(Equation 2)}$$

In step S24, the scheduler 110 determines whether the wireless-error-corrected maximum wireless communication speed calculated in step S23 is higher than the wired communication speed acquired in step S21.

When the wireless-error-corrected maximum wireless communication speed is higher than the wired communication speed (YES in step S24), the process returns to step S11. When the wireless-error-corrected maximum wireless communication speed is not higher than the wired communication speed (NO in step S24), the process proceeds to step S14.

Specific Example

FIG. 15 is a diagram illustrating a relationship among transmit power control, the wireless error rate, the wireless-error-rate-corrected maximum wireless communication speed, and the wired communication speed. A description of the transmit power field and the wireless error rate field is omitted because it has been given in FIG. 13.

A wireless-error-rate-corrected maximum wireless communication speed field records the wireless-error-rate-corrected maximum wireless communication speed (see step S23 of FIG. 14) calculated based on Equation 2 above. A wired communication speed field records the wired communication speed acquired by the scheduler 110 when the corresponding transmit power recorded in the transmit power field is set.

Here, as described in the specific example of the second embodiment, it is assumed that the PHY transmission unit 106 changes the current modulation scheme to 64QAM which is a modulation scheme corresponding to the modulation scheme ID number of 6 (see the row P3 of FIG. 11). Also, it is assumed that the PHY transmission unit 106 changes the current coding rate to a coding rate of 0.738 (see the row P3 of FIG. 11).

Also, it is assumed that the transmit power is 5 dBm (see a row P21 of FIG. 15). At this time, the base station 100 executes steps S21 and S22 to acquire the wireless error rate of 0% and the wired communication speed of 61 Mbps (see the row P21). Then, the scheduler 110 executes step S23 to calculate the wireless-error-corrected maximum wireless communication speed of 63.776 Mbps using Equation 2 $((100-0)\times63.776\times0.01)$.

Here, the wireless-error-corrected maximum wireless communication speed is 63.776 Mbps and the wired communication speed is 61 Mbps. Thus, the scheduler 110 determines YES in step S24, and the process returns to step S11.

The scheduler 110 instructs the PHY transmission unit 106 to reduce the currently set transmit power by the certain amount of power (step S11). In response to this instruction, the PHY transmission unit 106 sets a transmit power at 4 dBm by reducing the currently set transmit power 5 dBm by the certain amount of power 1 dBm (see a row P22 of FIG. 15).

At this time, the base station 100 executes steps S21 and S22 to acquire the wireless error rate of 4% and the wired communication speed of 61 Mbps (see the row P22 of FIG. 15), and determines the maximum wireless communication speed of 63.776. Then, the scheduler 110 executes step S23 to calculate the wireless-error-corrected maximum wireless communication speed of 61.224 Mbps using Equation 2 $((100-4)\times63.776\times0.01)$.

Here, the wireless-error-corrected maximum wireless communication speed is 61.224 Mbps and the wired communication speed is 61 Mbps. Thus, the scheduler 110 determines YES in step S24, and the process returns to step S11.

The scheduler 110 instructs the PHY transmission unit 106 to reduce the currently set transmit power by the certain amount of power (step S11). In response to this instruction, the PHY transmission unit 106 sets a transmit power at 3 dBm by reducing the currently set transmit power 4 dBm by the certain amount of power 1 dBm (see a row P23 of FIG. 15). At this time, the base station 100 executes steps S21 and S22 to acquire the wireless error rate of 15% and the wired communication speed of 56 Mbps (see the row P23), and determines the maximum wireless communication speed of 63.776 Mbps. Then, the scheduler 110 executes step S23 to calculate the wireless-error-corrected maximum wireless communication speed of 54.209 Mbps using Equation 2 $((100-15)\times63.776\times0.01)$.

Here, the wireless-error-corrected maximum wireless communication speed is 54.209 Mbps and the wired communication speed is 61 Mbps. Thus, the scheduler 110 determines NO in step S24, and the process proceeds to step S14.

The scheduler 110 instructs the PHY transmission unit 106 to increase the currently set transmit power 3 dBm by the certain amount of power 1 dBm. In response to this instruction, the PHY transmission unit 106 sets the transmit power at 4 dBm by increasing the currently set transmit power 3 dBm by the certain amount of power 1 dBm (step S14). As a result, the transmit power is set at 4 dBm.

As described above, the scheduler 110 reduces transmit power of a wireless signal in units of certain amounts of power (step S11 and NO in step S24). When the wireless-error-corrected maximum wireless communication speed of wireless communication performed at the reduced transmit power becomes lower than or equal to the wired communication speed (NO in step S24), the scheduler 110 executes the following processing. Specifically, the scheduler 110 increases by the certain amount of power the transmit power of the wireless signal set when the wireless-error-corrected maximum wireless communication speed is lower than or equal to the wired communication speed, and performs wireless communication at the increased transmit power (step S14).

According to the third embodiment, transmit power is reduced until the wireless-error-corrected maximum wireless communication speed becomes close to the wired communication speed. Therefore, transmit power may be further reduced compared with the transmit power control according to the second embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A base station that performs wireless communication with a first apparatus and that performs wired communication with a second apparatus, the base station comprising:
 a memory; and
 a processor coupled to the memory and configured to:
  determine, a first communication speed of the wireless communication;

determine, a second communication speed of the wired communication;

measure a wireless error rate of the wireless communication;

determine, when the wireless error rate is lower than or equal to a certain percentage, whether the first communication speed of the wireless communication is higher than the second communication speed of the wired communication, and change, when the first communication speed of the wireless communication is higher than the second communication speed of the wired communication, a currently set modulation and coding scheme to a different modulation and coding scheme corresponding to the second communication speed of the wired communication, a rate of the different modulation and coding scheme being lower than a rate of the currently set modulation and coding scheme;

reduce, after changing the currently set modulation and coding scheme to a modulation and coding scheme corresponding to the second communication speed of the wired communication, a transmit power of a wireless signal of the wireless communication, the transmit power of the wireless signal is reduced while maintaining a third communication speed of the wireless communication higher than the second communication speed of the wired communication, the third communication speed of the wireless communication being obtained by correcting the first communication speed of the wireless communication based on the wireless error rate.

2. The base station of claim 1, wherein
the processor is further configured to reduce the transmit power of the wireless signal while maintaining the wireless error rate of wireless communication performed at the reduced transmit power, lower than or equal to the certain percentage.

3. The base station of claim 2, wherein
the processor is further configured to:
reduce the transmit power of the wireless signal in units of a certain amount of power;
increase, when the wireless error rate of the wireless communication performed at the reduced transmit power has exceeded the certain percentage, the reduced transmit power of the wireless signal by the certain amount of power; and
perform wireless communication at the increased transmit power.

4. The base station of claim 1, wherein
the processor is further configured to:
reduce the transmit power of the wireless signal in units of certain amounts of power;
increase, when the third communication speed obtained based on the wireless error rate measured at the reduced transmit power has become lower than or equal to the second communication speed, the reduced transmit power of the wireless signal by the certain amount of power; and
perform the wireless communication at the increased transmit power.

5. The base station of claim 1, wherein the memory is configured to store information that associates a wireless quality with a communication speed, and
the processor is further configured to select, from the information, a communication speed associated with the wireless quality, and determine the selected communication speed as the first communication speed.

6. The base station of claim 5, wherein
the information further associates the wireless quality, the communication speed, and the modulation and coding scheme, in association with one another; and
the processor is further configured to change the currently set modulation and coding scheme to a modulation and coding scheme associated with a communication speed that is closest to the second communication speed.

7. A communication system comprising:
a first apparatus provided with a wireless communication function;
a second apparatus provided with a wired communication function; and
a base station configured to:
perform wireless communication with the first apparatus, and
perform wired communication with the second apparatus, wherein
the base station includes a memory, and a processor coupled to the memory and configured to:
determine, a first communication speed of the wireless communication;
determine, a second communication speed of the wired communication;
measure a wireless error rate of the wireless communication;
determine, when the wireless error rate is lower than or equal to a certain percentage, whether the first communication speed of the wireless communication is higher than the second communication speed of the wired communication, and
change, when the first communication speed of the wireless communication is higher than the second communication speed of the wired communication, a currently set modulation and coding scheme to a different modulation and coding scheme corresponding to the second communication speed of the wired communication, a rate of the different modulation and coding scheme being lower than a rate of the currently set modulation and coding scheme;
reduce, after changing the currently set modulation and coding scheme to a modulation and coding scheme corresponding to the second communication speed of the wired communication, a transmit power of a wireless signal of the wireless communication,
the transmit power of the wireless signal is reduced while maintaining a third communication speed of the wireless communication higher than the second communication speed of the wired communication, the third communication speed of the wireless communication being obtained by correcting the first communication speed of the wireless communication based on the wireless error rate.

8. A communication method executed by a base station that performs wireless communication with a first apparatus and that performs wired communication with a second apparatus, the communication method comprising:
determining, by the base station, a first communication speed of the wireless communication;
determining, by the base station, a second communication speed of the wired communication;
measuring, by the base station, a wireless error rate of the wireless communication;
determine, when the wireless error rate is lower than or equal to a certain percentage, whether the first communication speed of the wireless communication is higher than the second communication speed of the wired communication, and change, when the first communication speed of the wireless communication is higher than the second communication speed of the wired communication, a currently set modulation and coding scheme to a different modulation and coding scheme corresponding to the second communication speed of the wired communication, a rate of the different modulation and coding scheme being lower than a rate of the currently set modulation and coding scheme;

reduce, after changing the currently set modulation and coding scheme to a modulation and coding scheme corresponding to the second communication speed of the wired communication, a transmit power of a wireless signal of the wireless communication, the transmit power of the wireless signal is reduced while maintaining a third communication speed of the wireless communication higher than the second communication speed of the wired communication, the third communication speed of the wireless communication being obtained by correcting the first communication speed of the wireless communication based on the wireless error rate.

* * * * *